US009444996B2

(12) United States Patent
Chau et al.

(10) Patent No.: US 9,444,996 B2
(45) Date of Patent: Sep. 13, 2016

(54) CAMERA TAP SWITCH

(71) Applicant: Microsoft Technology Licensing, LLC, Redmond, WA (US)

(72) Inventors: Seang Y. Chau, Los Altos, CA (US); Alda Yuk Ying Luong, Oakland, CA (US); Jason Williams, Santa Clara, CA (US); Michael J. Lammers, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/716,355

(22) Filed: May 19, 2015

(65) Prior Publication Data
US 2016/0021300 A1    Jan. 21, 2016

Related U.S. Application Data

(63) Continuation of application No. 13/871,905, filed on Apr. 26, 2013, now Pat. No. 9,066,007.

(51) Int. Cl.
| H04N 5/232 | (2006.01) |
| G06F 1/00 | (2006.01) |
| G06F 3/00 | (2006.01) |
| G06F 1/16 | (2006.01) |
| G06F 3/01 | (2006.01) |

(52) U.S. Cl.
CPC ........ *H04N 5/23216* (2013.01); *G06F 1/1686* (2013.01); *G06F 1/1694* (2013.01); *G06F 3/011* (2013.01); *H04N 5/232* (2013.01); *H04N 5/23229* (2013.01); *G06F 2200/1636* (2013.01)

(58) Field of Classification Search
CPC ............... H04N 5/23216; H04N 5/23229; H04N 5/232; G06F 1/1694; G06F 1/686
See application file for complete search history.

(56) References Cited

U.S. PATENT DOCUMENTS

| 3,305,148 A | 2/1967 | Zimmerman |
| 5,282,044 A | 1/1994 | Misawa et al. |
| 5,610,678 A | 3/1997 | Tsuboi et al. |
| 6,058,141 A | 5/2000 | Barger et al. |
| 6,168,057 B1 | 1/2001 | Schwabe |
| 6,252,389 B1 | 6/2001 | Baba et al. |
| 6,275,829 B1 | 8/2001 | Angiulo et al. |
| 6,561,702 B1 * | 5/2003 | Yik .......................... A45C 11/38 396/420 |

(Continued)

FOREIGN PATENT DOCUMENTS

| CN | 202838971 | 3/2013 |
| EP | 0985899 | 3/2000 |

(Continued)

OTHER PUBLICATIONS

"International Preliminary Report on Patentability", Application No. PCT/US2014/035061, Jun. 23, 2015, 7 pages.

(Continued)

*Primary Examiner* — W B Perkey
(74) *Attorney, Agent, or Firm* — Tom Wong; Micky Minhas

(57) ABSTRACT

Various embodiments provide a wearable camera that can be worn by a user. The wearable camera includes an accelerometer that can be used to detect camera motion. Input can be provided to the camera in the form of one or more taps which have an associated motion profile, as sensed by the accelerometer. The tap or taps can be mapped to camera functionality to activate the functionality.

20 Claims, 9 Drawing Sheets

(56) References Cited

U.S. PATENT DOCUMENTS

| | | |
|---|---|---|
| 6,612,404 B2 | 9/2003 | Sweet et al. |
| D483,784 S | 12/2003 | Ting |
| 6,667,771 B1 | 12/2003 | Kweon |
| 6,680,748 B1 | 1/2004 | Monti |
| 6,727,949 B1 | 4/2004 | Saruwatari et al. |
| 6,757,027 B1 | 6/2004 | Edwards et al. |
| 6,867,680 B1 | 3/2005 | Kulle |
| 7,012,621 B2 | 3/2006 | Crosby et al. |
| 7,092,614 B2 | 8/2006 | Liebhold et al. |
| D534,939 S | 1/2007 | Sheehan et al. |
| 7,326,869 B2 | 2/2008 | Flynn et al. |
| 7,454,711 B2 | 11/2008 | Angiulo et al. |
| 7,490,721 B2 | 2/2009 | Bishop |
| 7,574,129 B2 | 8/2009 | Tsukuda |
| 7,623,182 B2 | 11/2009 | Byrne et al. |
| 7,778,023 B1 | 8/2010 | Mohoney |
| 7,783,133 B2 | 8/2010 | Dunki-Jacobs et al. |
| 8,031,255 B2 | 10/2011 | Usami |
| 8,159,363 B2 | 4/2012 | Song |
| 8,159,541 B2 | 4/2012 | McLeod |
| 8,270,827 B2 | 9/2012 | Tse, Jr. |
| 8,315,602 B2 * | 11/2012 | Fogel ............... H04L 12/5895 455/3.01 |
| 8,322,215 B2 | 12/2012 | Lakich et al. |
| 8,330,854 B2 | 12/2012 | Kossin |
| 8,355,619 B2 | 1/2013 | Kato et al. |
| 8,363,121 B2 | 1/2013 | Maeng |
| 8,374,498 B2 | 2/2013 | Pastore |
| 8,411,050 B2 * | 4/2013 | Zalewski ............ G06F 3/0426 345/173 |
| 8,514,292 B2 | 8/2013 | Cho |
| 8,515,241 B2 | 8/2013 | Forsyth et al. |
| 8,538,376 B2 | 9/2013 | Lee et al. |
| 8,587,670 B2 | 11/2013 | Wood et al. |
| 8,605,188 B2 | 12/2013 | Ishihara et al. |
| 8,979,398 B2 | 3/2015 | Han et al. |
| 9,066,007 B2 * | 6/2015 | Chau ................. H04N 5/23216 |
| 9,282,244 B2 | 3/2016 | Chau et al. |
| 2002/0140849 A1 | 10/2002 | Slatter et al. |
| 2002/0186317 A1 | 12/2002 | Kayanuma |
| 2003/0081121 A1 | 5/2003 | Kirmuss |
| 2003/0234860 A1 | 12/2003 | Sung et al. |
| 2004/0056949 A1 | 3/2004 | Lin |
| 2004/0089814 A1 | 5/2004 | Cheatle |
| 2004/0105024 A1 | 6/2004 | Takahashi |
| 2004/0145613 A1 | 7/2004 | Stavely et al. |
| 2004/0155968 A1 | 8/2004 | Cheatle et al. |
| 2004/0183912 A1 | 9/2004 | Szolyga et al. |
| 2004/0218081 A1 | 11/2004 | Lohr et al. |
| 2004/0240005 A1 | 12/2004 | Kim |
| 2005/0093988 A1 | 5/2005 | Haas et al. |
| 2005/0100329 A1 | 5/2005 | Lao et al. |
| 2005/0140798 A1 | 6/2005 | Tashiro et al. |
| 2005/0248453 A1 | 11/2005 | Fechter |
| 2006/0066753 A1 | 3/2006 | Gennetten et al. |
| 2006/0078215 A1 | 4/2006 | Gallagher |
| 2006/0140599 A1 | 6/2006 | Nomura et al. |
| 2006/0165160 A1 | 7/2006 | Winningstad et al. |
| 2006/0197843 A1 | 9/2006 | Yoshimatsu |
| 2006/0268162 A1 | 11/2006 | Kayanuma |
| 2007/0071423 A1 | 3/2007 | Fantone et al. |
| 2007/0214886 A1 | 9/2007 | Sheynblat |
| 2007/0291177 A1 | 12/2007 | Lahoz et al. |
| 2008/0055427 A1 | 3/2008 | Wendelrup |
| 2008/0136940 A1 | 6/2008 | Srikanth et al. |
| 2008/0165249 A1 | 7/2008 | DeKeyser |
| 2008/0180537 A1 | 7/2008 | Weinberg et al. |
| 2008/0259174 A1 | 10/2008 | Nagao |
| 2008/0260291 A1 | 10/2008 | Alakarhu et al. |
| 2008/0313172 A1 | 12/2008 | King et al. |
| 2009/0115865 A1 | 5/2009 | Kamada et al. |
| 2009/0117946 A1 | 5/2009 | Tomasini et al. |
| 2010/0026716 A1 | 2/2010 | Garbow et al. |
| 2010/0026839 A1 | 2/2010 | Border et al. |
| 2010/0027663 A1 | 2/2010 | Dai et al. |
| 2010/0053348 A1 | 3/2010 | Yoshimoto et al. |
| 2010/0079356 A1 | 4/2010 | Hoellwarth |
| 2010/0107126 A1 | 4/2010 | Lin et al. |
| 2010/0118158 A1 | 5/2010 | Boland et al. |
| 2010/0156676 A1 | 6/2010 | Mooring et al. |
| 2010/0175088 A1 | 7/2010 | Loebig et al. |
| 2010/0194682 A1 | 8/2010 | Orr et al. |
| 2010/0208370 A1 | 8/2010 | Chang |
| 2010/0306402 A1 | 12/2010 | Russell et al. |
| 2010/0316369 A1 | 12/2010 | Pyle |
| 2011/0053641 A1 | 3/2011 | Lee et al. |
| 2011/0064129 A1 | 3/2011 | Bennett et al. |
| 2011/0070829 A1 | 3/2011 | Griffin et al. |
| 2011/0081143 A1 * | 4/2011 | Kope .................. G03B 17/566 396/423 |
| 2011/0084661 A1 | 4/2011 | Saw |
| 2011/0084914 A1 | 4/2011 | Zalewski |
| 2011/0149094 A1 | 6/2011 | Chen et al. |
| 2011/0152629 A1 | 6/2011 | Eaton et al. |
| 2011/0158623 A1 | 6/2011 | Cheng et al. |
| 2011/0211061 A1 | 9/2011 | Kossin |
| 2012/0063736 A1 | 3/2012 | Simmons et al. |
| 2012/0086819 A1 | 4/2012 | Wilson et al. |
| 2012/0140093 A1 | 6/2012 | Chuang |
| 2012/0263430 A1 | 10/2012 | Spitzer-Williams |
| 2012/0290840 A1 * | 11/2012 | Willins ................ H04L 63/107 713/168 |
| 2012/0297334 A1 | 11/2012 | Fagans et al. |
| 2012/0320224 A1 | 12/2012 | Miyoshi et al. |
| 2013/0004153 A1 * | 1/2013 | McKee ................ F16M 11/041 396/420 |
| 2013/0014585 A1 | 1/2013 | Hetherington |
| 2013/0057489 A1 | 3/2013 | Morton et al. |
| 2013/0063538 A1 | 3/2013 | Hubner et al. |
| 2013/0069985 A1 | 3/2013 | Wong et al. |
| 2013/0094697 A1 * | 4/2013 | Adcock ............. G06F 17/30817 382/103 |
| 2013/0201344 A1 | 8/2013 | Sweet et al. |
| 2013/0229562 A1 | 9/2013 | Kamada et al. |
| 2013/0239001 A1 | 9/2013 | Maloney et al. |
| 2013/0328051 A1 | 12/2013 | Franklin et al. |
| 2014/0071091 A1 | 3/2014 | Barak et al. |
| 2014/0072312 A1 | 3/2014 | Aldana et al. |
| 2014/0092299 A1 | 4/2014 | Phillips et al. |
| 2014/0191707 A1 | 7/2014 | Carreon et al. |
| 2014/0211031 A1 | 7/2014 | Han |
| 2014/0270688 A1 | 9/2014 | Han |
| 2014/0270689 A1 | 9/2014 | Chau |
| 2014/0308031 A1 | 10/2014 | Han et al. |
| 2014/0320687 A1 | 10/2014 | Chau et al. |
| 2014/0333828 A1 | 11/2014 | Han et al. |
| 2014/0354880 A1 | 12/2014 | Han |
| 2015/0077552 A1 | 3/2015 | Yang et al. |
| 2016/0119544 A1 | 4/2016 | Chau et al. |

FOREIGN PATENT DOCUMENTS

| | | |
|---|---|---|
| EP | 1571634 | 9/2005 |
| EP | 1921844 | 5/2008 |
| EP | 2091247 | 8/2009 |
| EP | 2160019 | 3/2010 |
| GB | 2456587 | 7/2009 |
| JP | 2006129391 | 5/2006 |
| JP | 2009110351 | 5/2009 |
| WO | WO-03005702 | 1/2003 |

OTHER PUBLICATIONS

"Canon VIXIA HF R200 Full HD Camcorder with Dual SDXC Card", Retrieved from <http://www.amazon.com/Canon-VIXIA-R200-Camcorder-Slots/dp/B004HW7EAG> on Mar. 20, 2013, 9 pages.

"Canon: Ease of Use", Retrieved from: <http://www.usa.canon.com/cusa/consumer/standard_display/PS_Advantage_Ease> on Feb. 11, 2014, Mar. 12, 2011, 17 pages.

"Corrected Notice of Allowance", U.S. Appl. No. 13/871,905, Apr. 9, 2015, 2 pages.

(56) References Cited

OTHER PUBLICATIONS

"Corrected Notice of Allowance", U.S. Appl. No. 13/871,905, May 22, 2015, 2 pages.
"DVR003 Mini Camera Stick HD Mini Camera and Video Recorder", Retrieved from <http://www.spyville.com/dvr003-lawmate-camstick.html> on Apr. 16, 2013, 2013, 2 pages.
"Final Office Action", U.S. Appl. No. 13/754,719, Jan. 30, 2015, 18 pages.
"Final Office Action", U.S. Appl. No. 13/871,905, Sep. 23, 2014, 6 pages.
"Final Office Action", U.S. Appl. No. 13/873,069, Jan. 5, 2015, 20 pages.
"Final Office Action", U.S. Appl. No. 13/892,085, May 7, 2015, 34 pages.
"GeniusGuard™ Pen Spy Camera Recorder Model S3K", Retrieved from <http://www.eurekaplus.com/pen-spycam-recorder-s3k.html> on Apr. 16, 2013, 5 pages.
"Hall Effect Proximity Sensors Information", Retrieved from <http://www.globalspec.com/learnmore/sensors_transducers_detectors/proximity_presence_sensing/hall_effect_proximity_sensors> on Mar. 21, 2013, Aug. 31, 2012, 3 pages.
"Hall Effect Pushbutton Switches", Retrieved from <http://www.ottoexcellence.com/file.aspx?FileId=3337> on Mar. 20, 2013, 1 page.
"Hall Effect Sensor—SparkFun Electronics", Retrieved from <https://www.sparkfun.com/products/9312> on Mar. 21, 2013, Jan. 24, 2013, 7 pages.
"Hi-Res "Pen Cap" Pocket Wearable Spy Camera", Retrieved from <https://www.dynaspy.com/hi-res-pen-cap-pocket-spy-camera-4gb-sd-memory> on Apr. 16, 2013, 2013, 3 pages.
"Images of Nokia 6555 Mobile Phone", In: "Images of Nokia 6555 Mobile Phone", XP055143661, figures 1, 2, Oct. 1, 2014, 1 page.
"International Search Report and Written Opinion", Application No. PCT/US2014/022896, Jun. 16, 2014, 13 pages.
"International Search Report and Written Opinion", Application No. PCT/US2014/037406, Aug. 4, 2014, 13 Pages.
"International Search Report and Written Opinion", Application No. PCT/US2014/022892, Jul. 1, 2014, 14 Pages.
"International Search Report and Written Opinion", Application No. PCT/US2014/040110, Aug. 14, 2014, 14 Pages.
"International Search Report and Written Opinion", Application No. PCT/US2014/034065, Oct. 13, 2014, 18 pages.
"International Search Report and Written Opinion", Application No. PCT/US2014/035061, Jul. 28, 2014, 9 Pages.
"International Search Report and Written Opinion", Application No. PCT/US2013/013648, Apr. 11, 2014, 9 pages.
"Kodak Easyshare LS443 Zoom Digital Camera—User's Guide", Retrieved from <http://resources.kodak.com/support/shtml/en/manuals/urg00024/urg00024c8s1.shtml> on Mar. 20, 2013, 2 pages.
"Looxcie, User Manual for Android, Model LX1", Retrieved from <http://www.looxcie.com/wp-content/uploads/2012/10/LOOXCIE_LX1_UserManual_Android_15.pdf> on May 8, 2015, 2010, 36 pages.
"Memoto Lifelogging Camera", Retrieved from <http://www.kickstarter.com/projects/martinkallstrom/memoto-lifelogging-camera/> on Mar. 13, 2013, Oct. 23, 2012, 24 pages.
"Nokia 6555 User Guide", retrieved from https://web.archive.org/web/20101225182824/http://www.fido.ca/cms/pdf/en/userguides/Nokia6555_en.pdf on Oct. 29, 2014, Dec. 25, 2010, pp. 17, 61, 62.
"Non-Final Office Action", U.S. Appl. No. 13/754,719, May 13, 2015, 20 pages.
"Non-Final Office Action", U.S. Appl. No. 13/754,719, Jul. 9, 2014, 15 pages.
"Non-Final Office Action", U.S. Appl. No. 13/828,139, Aug. 7, 2014, 20 pages.
"Non-Final Office Action", U.S. Appl. No. 13/863,998, May 30, 2014, 9 pages.
"Non-Final Office Action", U.S. Appl. No. 13/871,905, May 15, 2014, 7 pages.
"Non-Final Office Action", U.S. Appl. No. 13/873,069, May 22, 2015, 20 pages.
"Non-Final Office Action", U.S. Appl. No. 13/873,069, Jul. 25, 2014, 17 pages.
"Non-Final Office Action", U.S. Appl. No. 13/892,085, Sep. 4, 2014, 19 pages.
"Non-Final Office Action", U.S. Appl. No. 13/908,906, Mar. 12, 2015, 13 pages.
"Non-Final Office Action", U.S. Appl. No. 14/285,237, Apr. 24, 2015, 15 pages.
"Notice of Allowance", U.S. Appl. No. 13/863,998, Oct. 31, 2014, 4 pages.
"Notice of Allowance", U.S. Appl. No. 13/871,905, Feb. 11, 2015, 4 pages.
"'Panasonic V10 Camcorder Black'—Overview", Retrieved from <http://dicksmith.com.au/product/XG1221/?utm_medium=lasoo&utm_campaign=catalogue&utm_source=XG1221> on Mar. 20, 2013, 2013, 3 pages.
"Second Written Opinion", Application No. PCT/US2014/035061, Mar. 30, 2015, 7 pages.
"Second Written Opinion", Application No. PCT/US2014/013648, Jan. 27, 2015, 7 Pages.
"Spy Mini DVR HDMI Camera", Retrieved from <http://www.balajitech.in/spy-camera.html> on Apr. 16, 2013, 28 pages.
"Supplemental Notice of Allowance", U.S. Appl. No. 13/863,998, Feb. 12, 2015, 2 pages.
"Supplemental Notice of Allowance", U.S. Appl. No. 13/863,998, Nov. 26, 2014, 2 pages.
"Tap Detection", Retrieved from <http://www.kionix.com/tap-detection> on Mar. 19, 2013, Oct. 5, 2012, 1 page.
"TouchOSC", Retrieved from <http://hexler.net/docs/touchosc-configuration-options> on Mar. 19, 2013, May 26, 2011, 4 Pages.
"User Guide Jawbone Era", Retrieved from <http://content.jawbone.com/static/www/pdf/manuals/era/jawbone-era-manual.pdf> on Mar. 18, 2013, 2010, 16 pages.
"Using Vicon Revue", Retrieved from <https://www.viconrevue.com/faqs/documents/UsingViconRevuev10_final.pdf> on Apr. 30, 2013, 2010, 41 pages.
"Written Opinion", Application No. PCT/US2014/022896, Feb. 12, 2015, 9 pages.
Boyle,"Smartphone Accelerometers Could Be Used to Eavesdrop on Nearby Devices", Retrieved from <http://www.popsci.com/technology/article/2011-10/smartphones-could-become-spyphones-using-accelerometer-keystroke-detection> on Mar. 25, 2013, Oct. 19, 2011, 2 pages.
Chua,"Shock and Mute Pager Applications Using Accelerometers", Freescale Semiconductor, Inc., Rev. 5, Oct. 2006, 8 pages.
Gallagher,"Using Vanishing Points to Correct Camera Rotation in Images", In 2nd Canadian Conference on Computer and Robot Vision, May 9, 2005, 8 pages.
Hodges,"SenseCam: A Wearable Camera which Stimulates and Rehabilitates Autobiographical Memory", In Memory, vol. 19, No. 7, Available at <http://research.microsoft.com/en-us/um/cambridge/projects/sensecam/pdf_files/memory.pdf>, Oct. 2011, 18 pages.
Jacobowitz,"Olympus Stylus 1050 SW", Retrieved from <http://www.pcmag.com/article2/0,2817,2333989,00.asp> on Mar. 21, 2013, Nov. 5, 2008, 6 pages.
Kaur,"A Combined DWT-DCT approach to perform Video compression base of Frame Redundancy", In Proceedings: International Journal of Advanced Research in Computer Science and Software Engineering, vol. 2, Issue 9, M.M. University, Mullane (Ambala), Haryana, India, Sep. 2012, pp. 325-332.
Liu,"uWave: Accelerometer-based Personalized Gesture Recognition and Its Applications", Pervasive and Mobile Computing, vol. 5, Issue 6, Available at <http://www.ruf.rice.edu/~mobile/publications/liu09percom.pdf>, Mar. 9, 2009, pp. 1-9.
Lopes,"Augmenting Touch Interaction Through Acoustic Sensing", Proceedings of the ACM International Conference on Interactive Tabletops and Surfaces, Jan. 1, 2011, 4 pages.
Robinson,"TapBack: Towards Richer Mobile Interfaces in Impoverished Contexts", Human Factors in Computing Systems, May 7, 2011, 4 pages.

(56) References Cited

OTHER PUBLICATIONS

Samadani,"Representative Image Thumbnails: Automatic and Manual", In Proceeding of Human Vision and Electronic Imaging XIII, Jan. 24, 2008, 13 pages.

Shiratori,"Accelerometer-based User Interfaces for the Control of a Physically Simulated Character", Proceedings of the First ACM SIGGRAPH Conference and Exhibition on Computer Graphics and Interactive Techniques in Asia, vol. 27, No. 5, Available at <http://graphics.cs.cmu.edu/projects/wii/SIGGRAPHAsia2008_wii.pdf>, Dec. 10, 2008, 9 pages.

Terbush,"Looxcie 2 Review", Retrieved from <http://www.laptopmag.com/camcorders/looxcie-2.aspx> on Mar. 20, 2013, May 9, 2012, 3 pages.

Thammineni,"Dynamic frame-rate selection for live lbr Video Encoders using trial frames", In Proceedings: IEEE International Conference on Multimedia and Expo, Ittiam Systems (Pvt.) Ltd., Bangalore, India, Jun. 23, 2008, pp. 817-820.

Tomkins,"Nikon D3100", Retrieved from <http://www.imaging-resource.com/PRODS/D3100/D3100VIDEO.HTM> on Mar. 14, 2013, Dec. 13, 2010, 10 pages.

Trumbo,"Samsung Flip Foldable", Retrieved from >http://www.conceptphones.comfsamsung/samsung-flip-foldable-phone-features-wrapscreen/, Jan. 9, 2012, 4 pages.

Wilt,"Review: Panasonic AG-AC160 and AG-HPX250 ⅓" 3-MOS Camcorders", Retrieved from <http://provideocoalition.com/awilt/story/review_panasonic_ag-ac160_and_ag-hpx250_1_3_3-mos_camcorders/P1/> on Mar. 14, 2013, Jan. 23, 2012, 32 pages.

Zhang,"Using Accelerometer in Windows 8* Metro Style App and a Case Study of Tap Detection", Intel Corporation, Available at <http://software.intel.com/sites/default/files/m/d/4/1/d/8/Accelerometer_Case_Study_Win8.pdf>, Jul. 11, 2012, 20 pages.

"Final Office Action", U.S. Appl. No. 13/908,906, Oct. 8, 2015, 11 pages.

"International Preliminary Report on Patentability", Application No. PCT/US2014/040110, Sep. 9, 2015, 10 pages.

"Notice of Allowance", U.S. Appl. No. 13/873,069, Oct. 14, 2015, 7 pages.

"Non-Final Office Action", U.S. Appl. No. 14/990,541, Mar. 2, 2016, 18 pages.

"Final Office Action", U.S. Appl. No. 14/990,541, Jun. 23, 2016, 22 pages.

"Foreign Office Action", EP Application No. 14727300.7, Jun. 22, 2016, 7 pages.

"Non-Final Office Action", U.S. Appl. No. 13/908,906, May 26, 2016, 13 pages.

* cited by examiner

CAMERA TAP SWITCH

RELATED APPLICATIONS

This application is a continuation of U.S. patent application Ser. No. 13/871,905, filed Apr. 26, 2013, entitled "Camera Tap Switch", the entire disclosure of which is hereby incorporated by reference herein in its entirety.

BACKGROUND

Physical buttons are not always an appealing feature to add to hardware, such as a camera. This is particularly true when the hardware or camera has a small form factor. Additional physical buttons can create a crowding situation on the hardware or camera and can lead to an unaesthetic appearance. Further, crowded buttons increase the likelihood that a user will inadvertently press the wrong button.

SUMMARY

This Summary is provided to introduce a selection of concepts in a simplified form that are further described below in the Detailed Description. This Summary is not intended to identify key features or essential features of the claimed subject matter.

Various embodiments provide a wearable camera that can be worn by a user. The wearable camera includes an accelerometer that can be used to detect camera motion. Input can be provided to the camera in the form of one or more taps which have an associated motion profile, as sensed by the accelerometer. The tap or taps can be mapped to camera functionality to activate the functionality.

In at least some embodiments, different combinations of taps can be mapped to different camera functionality. Further, in at least some embodiments, the camera includes a microphone which detects sound around the camera. The microphone can be used to sense a noise profile associated with the tap or taps that are received by the camera. The noise profile can be used, together with the motion profile, to confirm the input as a tap input.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
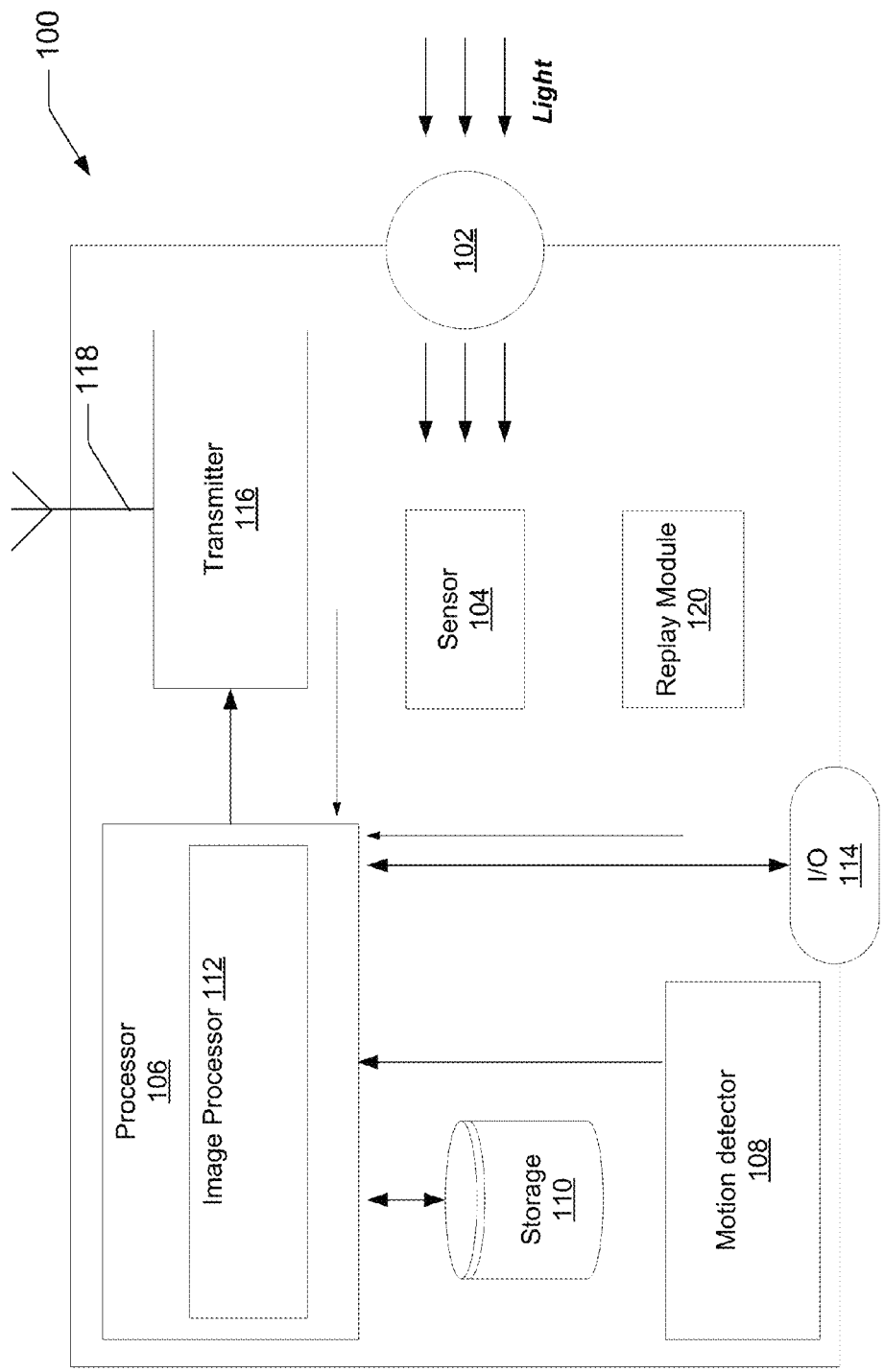
FIG. 1 is an example camera device in accordance with one or more embodiments.

Various embodiments provide a wearable camera that can be worn by a user. The wearable camera includes an accelerometer that can be used to detect camera motion. Input can be provided to the camera in the form of one or more taps which have an associated motion profile, as sensed by the accelerometer. The tap or taps can be mapped to camera functionality to activate the functionality. Any suitable type of functionality can be mapped to the tap or taps.

In at least some embodiments, different combinations of taps can be mapped to different camera functionality. Further, in at least some embodiments, the camera includes a microphone which detects sound around the camera. The microphone can be used to sense a noise profile associated with the tap or taps that are received by the camera. The noise profile can be used, together with the motion profile, to confirm the input as a tap input. This can help to disambiguate various other types of input that might be received by the camera. For example, the user may be wearing the camera and may jump up and down. The jump may have a motion profile that is similar to that of a tap. By looking for a noise profile associated with a tap when a tap-like motion profile is received, the camera can confirm whether or not the received input is a tap.

The camera can be worn in any suitable location. For example, the camera can be worn on a user's head such as, a way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing.

Various other embodiments provide a wearable camera that is mountable on a user's clothing. The camera is designed to be unobtrusive and user-friendly insofar as being mounted away from the user's face so as not to interfere with their view. In at least some embodiments, the camera includes a housing and a clip mounted to the housing to enable the camera to be clipped onto the user's clothing. The camera is designed to be lightweight with its weight balanced in a manner that is toward the user when clipped to the user's clothing.

In one or more embodiments, the camera includes a replay mode. When the replay mode is selected, the camera automatically captures image data, such as video or still images, and saves the image data to a memory buffer. In at least some embodiments, the size of the memory buffer can be set by the user to determine how much image data is to be collected. Once the memory buffer is full, the older image data is erased to make room for currently-captured image data. If an event occurs that the user wishes to memorialize through video or still images, a record button can be activated which saves the image data from the beginning of the memory buffer and continues recording until the user presses the record button again. In this manner, if an event occurs, the user is assured of capturing the event from a time t-x, where x is the length of the memory buffer, in time.

In the discussion that follows, a section entitled "Example Environment" describes an example environment in which the various embodiments can be utilized. Next, a section entitled "Replay Functionality" describes an example replay mode in accordance with one or more embodiments. Following this, a section entitled "Duel Encoding" describes an embodiment in which captured image data can be dual encoded in accordance with one or more embodiments. Next, a section entitled "Photo Log" describes an example photo log in accordance with one or more embodiments. Following this, a section entitled "Camera Tap Switch" describes a camera tap switch in accordance with one or more embodiments.

Consider now an example environment in which various embodiments can be practiced.

Example Environment

FIG. 1 illustrates a schematic of a camera device 100 in accordance with one or more embodiments. The camera device 100 includes a lens 102 having a focal length that is suitable for covering a scene to be pictured. In one embodiment, a mechanical device may be included with the lens 102 to enable auto or manual focusing of the lens. In another embodiment, the camera device 100 may be a fixed focus device in which no mechanical assembly is included to move the lens 102. A sensor 104 having a sensing surface (not shown) is also included to convert an image formed by the incoming light on the sensing surface of the sensor 104 into a digital format. The sensor 104 may include a charge-coupled device (CCD) or complementary metal oxide semiconductor (CMOS) image sensor for scanning the incoming light and creating a digital picture. Other technologies or devices may be used so long as the used device is capable of converting an image formed by the incoming light on a sensing surface into the digital form. Typically, these image detection devices determine the effects of light on tiny light sensitive devices and record the changes in a digital format.

It should be appreciated that the camera device 100 may include other components such as a battery or power source and other processor components that are required for a processor to operate. However, to avoid obfuscating the teachings, these well-known components are being omitted. In one embodiment, the camera device 100 does not include a view finder or a preview display. In other embodiments, however, a preview display may be provided. The techniques described herein can be used in any type of camera, and are particularly effective in small, highly portable cameras, such as those implemented in mobile telephones and other portable user equipment. Thus, in one embodiment, the camera device 100 includes hardware or software for making and receiving phone calls. Alternately, the camera device 100 can be a dedicated, stand-alone camera.

In at least some embodiments, the camera device 100 further includes a motion detector 108 that can include an accelerometer and, in some embodiments, a gyroscope. The accelerometer is used for determining the direction of gravity and acceleration in any direction. The gyroscope may also be used either in addition to the accelerometer or instead of the accelerometer. The gyroscope can provide information about how the rotational angle of the camera device 100 changes over time. Any other type of sensor may be used to detect the camera's motion. Using the rotational angle, an angle of rotation of the camera device 100 may be calculated, if the camera device 100 is rotated. In at least some embodiments, input can be provided to the camera in the form of one or more taps which have an associated motion profile, as sensed by the accelerometer. The tap or taps can be mapped to camera functionality to activate the functionality. Any suitable type of functionality can be mapped to the tap or taps.

In at least some embodiments, different combinations of taps can be mapped to different camera functionality. Further, in at least some embodiments, the camera includes a microphone which detects sound around the camera. The microphone can be used to sense a noise profile associated with the tap or taps that are received by the camera. The noise profile can be used, together with the motion profile, to confirm the input as a tap input. This can help to disambiguate various other types of input that might be received by the camera, as noted above and below.

Further included is an input/output (I/O) port 114 for connecting the camera device 100 to an external device, including a general purpose computer. The I/O port 114 may be used for enabling the external device to configure the camera device 100 or to upload/download data. In one embodiment, the I/O port 114 may also be used for streaming video or pictures from the camera device 100 to the external device. In one embodiment, the I/O port may also be used for powering the camera device 100 or charging a rechargeable battery (not shown) in the camera device 100.

The camera device 100 may also include an antenna 118 that is coupled to a transmitter/receiver (Tx/Rx) module 116. The Tx/Rx module 116 is coupled to a processor 106. The antenna 118 may be fully or partly exposed outside the body of the camera device 100. However, in another embodiment, the antenna 118 may be fully encapsulated within the body of the camera device 100. The Tx/Rx module 116 may be configured for Wi-Fi transmission/reception, Bluetooth transmission/reception or both. In another embodiment, the Tx/Rx module 116 may be configured to use a proprietary protocol for transmission/reception of the radio signals. In yet another embodiment, any radio transmission or data transmission standard may be used so long as the used standard is capable of transmitting/receiving digital data and control signals. In one embodiment, the Tx/Rx module 116 is a low power module with a transmission range of less than ten feet. In another embodiment, the Tx/Rx module 116 is a low power module with a transmission range of less than five feet. In other embodiments, the transmission range may be configurable using control signals received by the camera device 100 either via the I/O port 114 or via the antenna 118.

The camera device 100 further includes a processor 106. The processor 106 is coupled to the sensor 104 and the motion detector 108. The processor 106 may also be coupled to storage 110, which, in one embodiment, is external to the processor 106. The storage 110 may be used for storing programming instructions for controlling and operating other components of the camera device 100. The storage 110 may also be used for storing captured media (e.g., pictures and/or videos). In another embodiment, the storage 110 may be a part of the processor 106 itself.

In one embodiment, the processor 106 may include an image processor 112. The image processor 112 may be a hardware component or may also be a software module that is executed by the processor 106. It may be noted that the processor 106 and/or the image processor 112 may reside in different chips. For example, multiple chips may be used to implement the processor 106. In one example, the image processor 112 may be a Digital Signal Processor (DSP). The image processor can be configured as a processing module, that is a computer program executable by a processor. In at least some embodiments, the processor 112 is used to process a raw image received from the sensor 104 based, at least in part, on the input received from the motion detector 108. Other components such as Image Signal Processor (ISP) may be used for image processing.

In one embodiment, the storage 110 is configured to store both raw (unmodified image) and the corresponding modified image. In one or more embodiments, the storage 110 can include a memory buffer, such as a flash memory buffer, that can be used as a circular buffer to facilitate capturing image data when the camera is set to a replay mode that is supported by replay module 120. The replay module 120 can be implemented in connection with any suitable hardware, software, firmware, or combination thereof When the replay mode is selected, the camera automatically captures image data, such as video or still images, and saves the image data to the memory buffer. In at least some embodiments, the size of the memory buffer can be set by the user to determine how much image data is to be collected. If an event occurs that the user wishes to memorialize through video or still images, a record button can be activated which saves the image data from the beginning of the memory buffer and continues recording until the user presses the record button again. In this manner, if an event occurs, the user is assured of capturing the event from a time t-x, where x is the length of the memory buffer, in time.

A processor buffer (not shown) may also be used to store the image data. The pictures can be downloaded to the external device via the I/O port 114 or via the wireless channels using the antenna 118. In one embodiment, both unmodified and modified images are downloaded to the external device when the external device sends a command to download images from the camera device 110. In one embodiment, the camera device 100 may be configured to start capturing a series of images at a selected interval.

In one embodiment, a raw image from the sensor 104 is inputted to an image processor (such as an ISP) for image processing or blur detection. After image processing is applied to the image outputted by the image processor, the modified image is encoded. The image encoding is typically performed to compress the image data.

In an example embodiment, the camera device 100 may not include the components for processing the image captured by the sensor 104. Instead, the camera device 100 may include programming instructions to transmit the raw image after extracting the image from the sensor 104 to a cloud based processing system that is connected to the camera device 100 via the Internet or a local area network. The cloud based system is configured to receive the raw image and process the image or images as described above and below. The encoded image is then either stored in a selected cloud based storage or the image is sent back to the camera device 100 or to any other device according to a user configuration. The use of a cloud based image processing system can reduce a need for incorporating several image processing components in each camera device, thus making a camera device lighter, more energy efficient and cheaper.

In another example embodiment, instead of a cloud based image processing, the camera device 100 may send either a raw image or the image processed through an image processor to another device, e.g., a mobile phone or a computer. The image may be transmitted to the mobile phone (or a computer) for further processing via Wi-Fi, Bluetooth or any other type of networking protocol that is suitable for transmitting digital data from one device to another device. After the mobile device receives the image or images, according to one or more embodiments described herein, the produced image may be saved to local storage on the device, transferred for storage in a cloud based storage system, or transmitted to another device, according to user or system configurations.

In one embodiment, the native image processing system in the camera device 100 may produce images and/or videos in a non-standard format. For example, a 1200×1500 pixel image may be produced. This may be done by cropping, scaling, or using an image sensor with a non-standard resolution. Since methods for transforming images in a selected standard resolution are well-known, there will be no further discussion on this topic.

Various embodiments described above and below can be implemented utilizing a computer-readable storage medium that includes instructions that enable a processing unit to implement one or more aspects of the disclosed methods as well as a system configured to implement one or more aspects of the disclosed methods. By "computer-readable storage medium" is meant all statutory forms of media. Accordingly, non-statutory forms of media such as carrier waves and signals per se are not intended to be covered by the term "computer-readable storage medium".

As noted above, camera device 100 can assume any suitable form of wearable camera. The camera can be worn in any suitable location relative to a user. For example, the camera can be worn on a user's head such as, by a way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing or other items carried by a user, such as a backpack, purse, briefcase, and the like.

In the example provided just below, a wearable camera is described in the context of a camera that is mountable on the user's clothing. It is to be appreciated and understood, however, that other types of non-clothing mountable, wearable cameras can be utilized without departing from the spirit and scope of the claimed subject matter.

Figure 2:
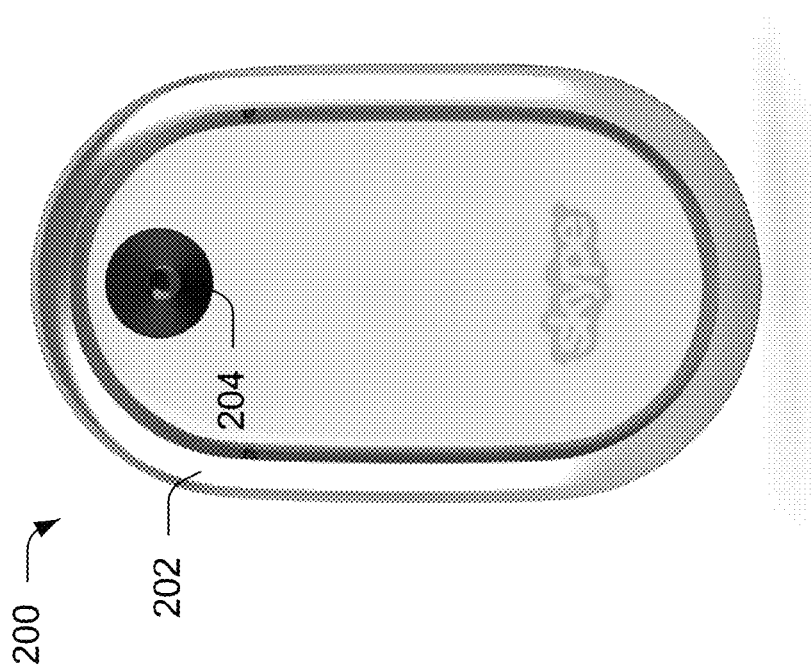
FIG. 2 illustrates an example camera device in accordance with one or more embodiments.
Figure 3:
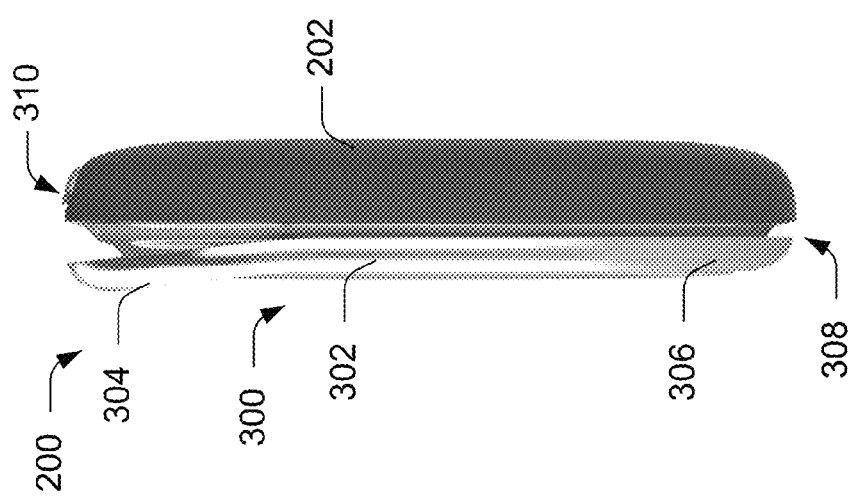
FIG. 3 illustrates an example camera device in accordance with one or more embodiments.

Moving on to FIGS. 2 and 3, consider the following. FIG. 2 illustrates an example camera device 200 in a front elevational view, while FIG. 3 illustrates the camera device 200 in a side elevational view. The camera device 200 includes a housing 202 that contains the components described in FIG. 1. Also illustrated is a camera lens 204 (FIG. 2) and a fastening device 300 (FIG. 3) in the form of a clip that operates in a manner that is similar to a clothespin. Specifically, the fastening device 300 includes a prong 302 with a body having a thumb-engageable portion 304. The body extends along an axis away from the thumb-engageable portion 304 toward a distal terminus 306. A spring mechanism, formed by the body or separate from and internal relative to the body, enables prong 302 to be opened responsive to pressure being applied to the thumb-engageable portion 304. When opened, a piece of clothing can be inserted into area 308. When the thumb-engageable portion 304 is released, the clothing is clamped in place by the prong 302 thereby securely mounting the camera device on a piece of clothing. For example, the camera device can be mounted, as described above, on a necktie, blouse, shirt, pocket, and the like.

In addition, camera device 200 can include a number of input buttons shown generally at 310. The input buttons can include, by way of example and not limitation, an input button to take a still picture, an input button to initiate the replay mode, an input button to initiate a video capture mode, and an input button to enable the user to adjust the buffer size that is utilized during the replay mode. It is to be appreciated and understood that the various input buttons can be located anywhere on the camera device 200.

It may be noted that even though the camera device 200 is shown to have a particular shape, the camera device 100 can be manufactured in any shape shape and size suitable and sufficient to accommodate the above described components of the camera device 100. The housing 202 of the camera device may be made of a metal molding, a synthetic material molding or a combination thereof. In other embodiments, any suitable type of material may be used to provide a durable and strong outer shell for typical portable device use.

In addition, the fastening device 300 can comprise any suitable type of fastening device. For example, the fastening device may be a simple slip-on clip, a crocodile clip, a hook, a Velcro or a magnet or a piece of metal to receive a magnet. The camera device 200 may be affixed permanently or semi-permanently to another object using the fastening device 300.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the camera device 200 may include a computer-readable medium that may be configured to maintain instructions that cause the camera's software and associated hardware to perform operations. Thus, the instructions function to configure the camera's software and associated hardware to perform the operations and in this way result in transformation of the software and associated hardware to perform functions. The instructions may be provided by the computer-readable medium to the camera device through a variety of different configurations.

One such configuration of a computer-readable medium is signal bearing medium and thus is configured to transmit the instructions (e.g., as a carrier wave) to the camera device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having considered an example operating environment in accordance with one or more embodiments, consider now a discussion of replay functionality and other features that can be provided by the camera device.

Replay Functionality

As noted above, camera device 200 includes a replay mode. When the replay mode is selected, as by the user pressing an input button associated with initiating the replay mode, the camera automatically captures image data, such as video or still images, and saves the image data to a memory buffer. In one or more embodiments, the memory buffer is a circular buffer that saves an amount of image data, for example video data. When the memory buffer is full of image data, it deletes the oldest image data to make room for newly recorded image data. This continues until either the user exits the replay mode or presses a button associated with initiating video capture, i.e. the "record" button.

In at least some embodiments, the size of the memory buffer can be set by the user to determine how much image data is to be collected. As an example, the user might set the length of the memory buffer to correspond to 5 seconds, 30 seconds, 1 minute, 2 minutes, and longer.

Assume now that an event occurs that the user wishes to memorialize through video or still images. Assume also that the user has initiated the replay mode so that video data is currently being buffered in the memory buffer. By pressing the "record" button the video data is now saved from the beginning of the memory buffer and recording continues until the user presses the record button again. In this manner, if an event occurs, the user is assured of capturing the event from a time t-x, where x is the length of the memory buffer, in time. So, for example, if the user initially set the memory buffer to capture 2 minutes worth of video data, by pressing the "record" button, the last 2 minutes of video data will be recorded in addition to the currently recorded video data.

In one or more embodiments, the memory buffer comprises flash memory. When the user presses the "record" button and the camera device is in replay mode, a pointer is used to designate where, in flash memory, the beginning of the captured video data occurs, e.g., the beginning of the last 2 minutes of video data prior to entering the "record" mode. In other embodiments, the video data captured during replay mode and "record" mode can be written to an alternate storage location.

Figure 4:
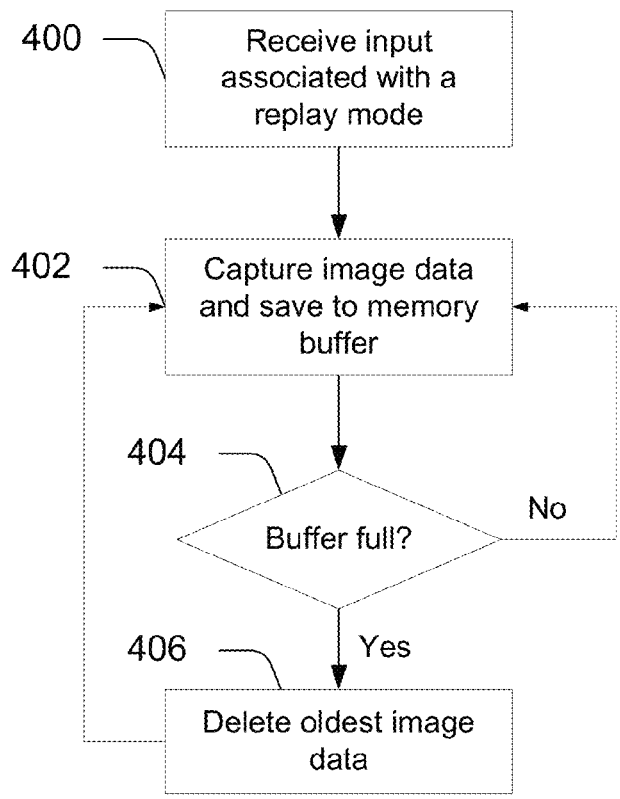
FIG. 4 is a flow diagram that describes steps in a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, the method is performed by a suitably-configured camera device such as the one described above.

Step 400 receives input associated with a replay mode. This step can be performed in any suitable way. For example, in at least some embodiments, this step can be performed by receiving input from the user via a suitable input device on the camera device. Responsive to receiving the input associated with the replay mode, step 402 captures image data and saves the image data to a memory buffer. Step 404 ascertains whether the buffer is full. If the buffer is not full, the method returns to step 402 and continues to capture image data and save image data to the memory buffer. If, on the other hand, the buffer is full, step 406 deletes the oldest image data in the memory buffer and returns to step 402 to capture subsequent image data.

This process continues until either the user presses the "record" button or exits the replay mode.

Figure 5:
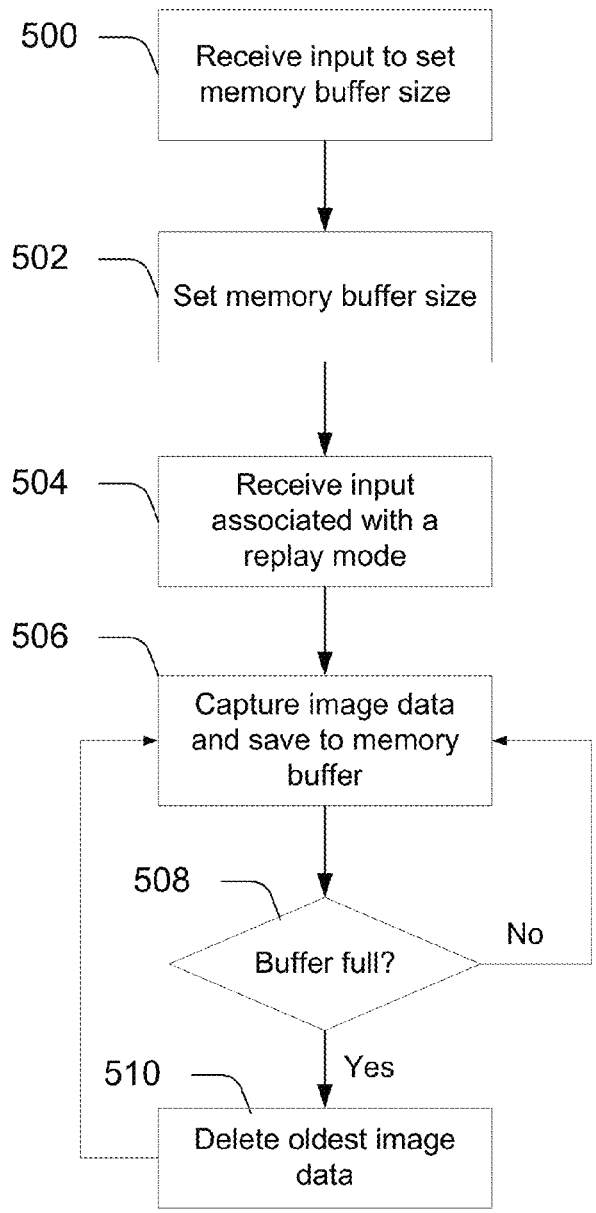
FIG. 5 is a flow diagram that describes steps in a method in accordance with one or more embodiments.

FIG. 5 is a flow diagram that describes steps in another method in accordance with one or more embodiments. The method, which allows a user to set the camera device's memory buffer size, can be performed in connection with any suitable hardware, software, firmware, or combination thereof. In at least some embodiments, the method is performed by a suitably-configured camera device such as the one described above.

Step 500 receives input to set a memory buffer size. The step can be performed in any suitable way. For example, in at least some embodiments, the step can be performed by receiving user input by way of a suitably-configured input mechanism such as a button on the camera device. Responsive to receiving this input, step 502 sets the memory buffer size.

Step 504 receives input associated with a replay mode. This step can be performed in any suitable way. For example, in at least some embodiments, this step can be performed by receiving input from the user via a suitable input device on the camera device. Responsive to receiving the input associated with the replay mode, step 506 captures image data and saves the image data to a memory buffer.

Step 508 ascertains whether the buffer is full. If the buffer is not full, the method returns to step 506 and continues to capture image data and save image data to the memory buffer. If, on the other hand, the buffer is full, step 510 deletes the oldest image data in the memory buffer and returns to step 506 to capture subsequent image data.

This process continues until either the user presses the "record" button or exits the replay mode.

Figure 6:
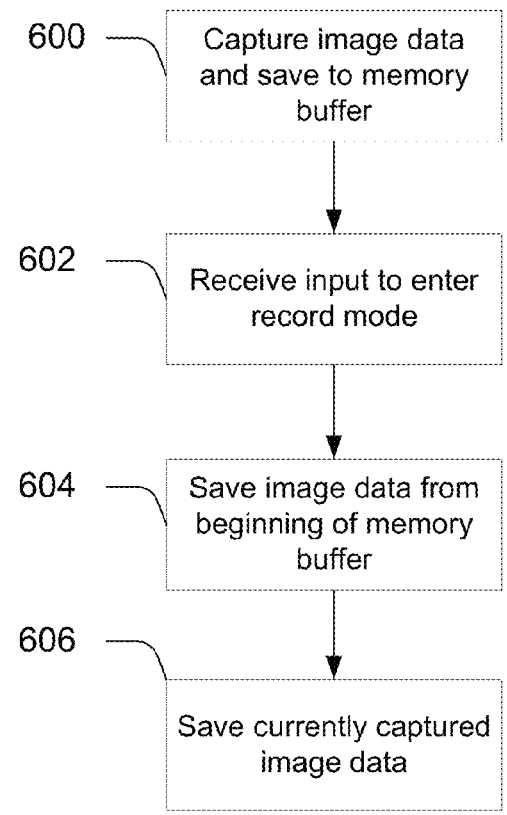
FIG. 6 is a flow diagram that describes steps in a method in accordance with one or more embodiments.

FIG. 6 is a flow diagram that describes steps in another method in accordance with one or more embodiments. The method can be performed in connection with any suitable hardware, software, firmware, or combination thereof. In at least some embodiments, the method is performed by a suitably-configured camera device such as the one described above.

Step 600 captures image data and saves the image data to a memory buffer. The step can be performed in any suitable way. For example, the step can be performed as described in connection with FIG. 4 or 5. Step 602 receives input to enter the camera device's record mode. This step can be performed, for example, by receiving user input by way of a "record" button. Responsive to receiving the input to enter record mode, step 604 saves image data from the beginning of the memory buffer. This step can be performed in any suitable way. For example, the step can be performed by setting a pointer to point to the beginning of the memory buffer. Step 606 saves currently captured image data in addition to the image data from the beginning of the memory buffer. This step can be performed until the user presses the "record" button once more.

Having considered an example replay mode and how it can be implemented with a suitably hiding configured camera device, consider now aspects of a dual encoding process.

Dual Encoding

In one or more embodiments, the camera device's processor 106 (FIG. 1) is configured to encode image data at different levels of resolution. For example, the camera device can encode image data at a low level of resolution and at a high level of resolution as well. Any suitable levels of resolution can be utilized. In at least some embodiments, the low level of resolution is Quarter-VGA (e.g., 320×240) and the high level of resolution is 720p (e.g., 1280×720).

Encoding image data at different resolutions levels can enhance the user's experience insofar as giving the user various options to transfer the saved image data. For example, at lower resolution levels, the captured image data can be streamed to a device such as a smart phone. Alternately or additionally, at higher resolution levels, when the user has Wi-Fi accessibility, they can transfer the image data to a network device such as a laptop or desktop computer.

Having considered a dual encoding scenario, consider now aspects of a photo log that can be constructed using the principles described above.

Photo Log

Photo log refers to a feature that enables a user to log their day in still photos at intervals of their own choosing. So, for example, if the user wishes to photo log their day at every 3 minutes, they can provide input to the camera device so that every 3 minutes the camera automatically takes a still photo and saves it. At the end of the day, the user will have documented their day with a number of different still photos.

In at least some embodiments, the photo log feature can work in concert with the replay mode described above. For example, if the user has entered the replay mode by causing image data to be captured and saved to the memory buffer, the camera device's processor can process portions of the captured video data at defined intervals to provide the still photos. This can be performed in any suitable way. For example, the camera device's processor can process the video data on the camera's photosensor and read predefined areas of the photosensor to process the read areas into the still photos. In some instances the photo format is a square format so that the aspect ratio is different from that aspect ratio of the video data.

Having considered an example photo log feature, consider now how this feature can be used in connection with the camera embodiments described below.

Accelerometer-Based Camera Tap Switch

As noted above, input can be received by the camera in the form of one or more taps which have an associated motion profile, as sensed by the accelerometer. The tap can occur at any suitable location on the camera's housing. In at least some embodiments, a dedicated tap area may be provided and may have characteristics to facilitate detection. These characteristics may include, by way of example and not limitation, being formed from a material that produces a richer or more identifiable profile. The tap or taps can be mapped to camera functionality to activate the functionality. Any suitable type of functionality can be mapped to the tap or taps. For example, in at least some embodiments, a tap or taps can be mapped to functionality that enables video taken by the camera to be bookmarked. For example, assume that a user is wearing the camera and has placed a camera into a photo log mode that automatically captures video. At some point, something interesting may occur in the video that the user wishes to bookmark. At this point, if the user taps the camera housing, the camera can detect the tap and take steps to bookmark the video.

Figure 7:
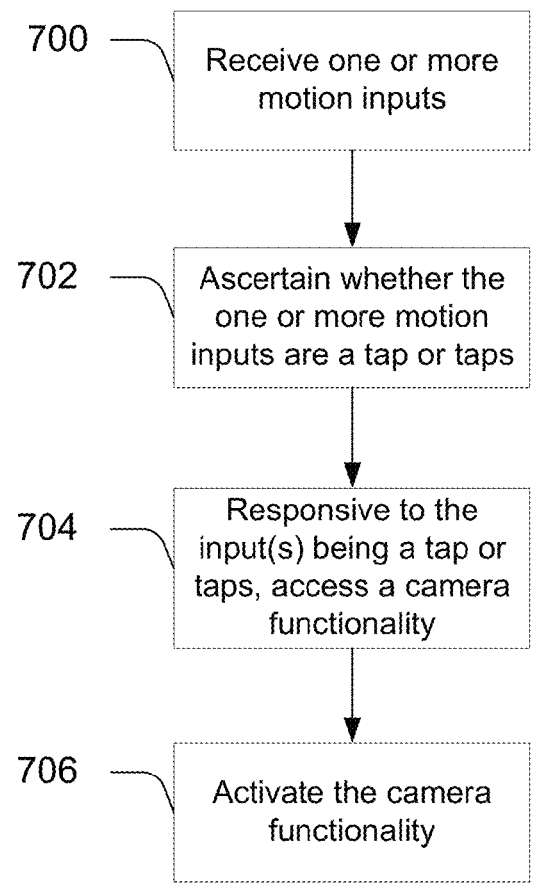
FIG. 7 is a flow diagram that describes steps in a method in accordance with one or more embodiments.

FIG. 7 is a flow diagram that describes steps in another method in accordance with one or more embodiments. The method can be performed in connection with any suitable hardware, software, firmware, or combination thereof. In at least some embodiments, the method is performed by a suitably-configured camera device such as the one described above.

Step 700 receives one or more motion inputs. Step 702 ascertains whether the one or more motion inputs are a tap or taps, respectively. This step can be performed in any suitable way. In at least some embodiments, the step is performed through the use of an accelerometer. Specifically, a tap or taps can have an associated profile or profiles as represented by accelerometer data. These profiles can be stored on the camera device in storage, such as storage 110. When the motion input is received, the accelerometer can detect the motion and produce associated accelerometer data. The camera's processor can then analyze the accelerometer data associated with the motion input and look for a particular stored profile associated with the tap or taps. If an input is received that has a profile that matches or resembles the stored tap profile(s) to a certain degree, the processor can ascertain that the input is a tap.

Responsive to the input(s) being a tap or taps, step 704 accesses a camera functionality that is associated with the input that was received. As noted above, any suitable type of functionality can be accessed. In at least some embodiments, such functionality is functionality that enables video, currently being taken by the camera, to be bookmarked. Step 706 activates the camera functionality. This step can be performed in any suitable way. For example, where the camera functionality bookmarks video taken by the camera, the step can be performed by actually bookmarking the video data.

In at least some embodiments, different combinations of taps can be mapped to different camera functionality. Thus, a single tap might be mapped to a first functionality, a double tap might be mapped to a second functionality, a triple tap might be mapped to a third functionality, and so on. Further, different tap patterns can be mapped to different functionalities. For example, two taps in rapid succession followed by a third somewhat delayed tap might be mapped to one functionality while a single tap followed by two taps in rapid succession might be mapped to another different functionality.

Figure 8:
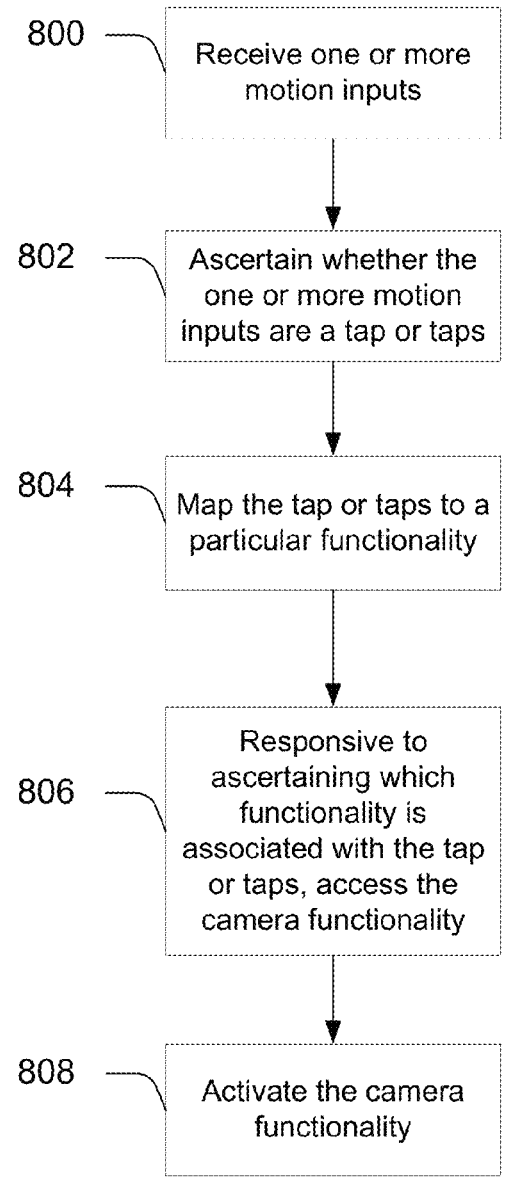
FIG. 8 is a flow diagram that describes steps in a method in accordance with one or more embodiments.

FIG. 8 is a flow diagram that describes steps in another method in accordance with one or more embodiments. The method can be performed in connection with any suitable hardware, software, firmware, or combination thereof. In at least some embodiments, the method is performed by a suitably-configured camera device such as the one described above.

Step 800 receives one or more motion inputs. Step 802 ascertains whether the one or more motion inputs are a tap or taps, respectively. This step can be performed in any suitable way. In at least some embodiments, this step is performed through the use of an accelerometer. Specifically, a tap or taps can have an associated profile or profiles as represented by accelerometer data. These profiles can be stored on the camera device in storage, such as storage 110. When the motion input is received, the accelerometer can detect the motion and produce associated accelerometer data. The camera's processor can then analyze the accelerometer data associated with the motion input and look for a particular stored profile associated with the tap or taps. If an input is received that has a profile that matches or resembles the stored tap profile(s) to a certain degree, the processor can ascertain that the input is a tap.

Step 804 maps the tap or taps to a particular functionality. Specifically, in this embodiment, different combinations of taps can be mapped to different functionalities, respectively. Accordingly, this step ascertains which of a number of different functionalities the tap or taps are associated with.

Responsive to ascertaining which functionality is associated with the tap or taps, step 806 accesses the camera functionality that is associated with the input that was received. As noted above, any suitable type of functionality can be accessed. Step 808 activates the camera functionality. This step can be performed in any suitable way.

Further, in at least some embodiments, the camera includes a microphone which detects sound around the camera. The microphone can be used to sense or create a noise profile associated with motion input that is received by the camera. The noise profile can be used, together with the motion profile, to confirm whether or not the motion input is a tap input. This can help to disambiguate various other types of input that might be received by the camera. For example, the user may be wearing the camera and may jump up and down. The jump may have a motion profile that is similar to that of a tap. However, the jump also has a noise profile. By capturing the noise profile of the jump and comparing it with noise profiles of known taps that can be stored on the camera, the camera can confirm whether or not the received motion input is a tap. For example, while the motion profile of the jump may be similar to that of a tap, if the noise profile of the jump is different from that of the tap, the camera can conclude that the motion input is not, in fact, a tap.

Figure 9:
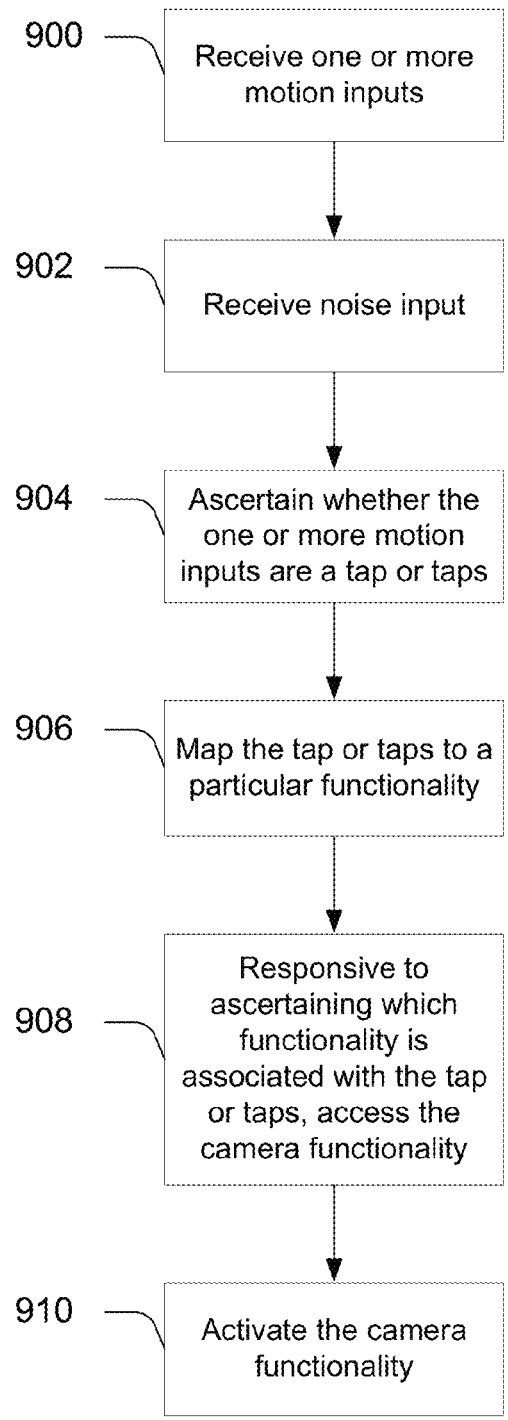
FIG. 9 is a flow diagram that describes steps in a method in accordance with one or more embodiments.

FIG. 9 is a flow diagram that describes steps in another method in accordance with one or more embodiments. The method can be performed in connection with any suitable hardware, software, firmware, or combination thereof. In at least some embodiments, the method is performed by a suitably-configured camera device such as the one described above.

Step 900 receives one or more motion inputs. Step 902 receives noise input associated with the motion input. The step can be performed using the camera's microphone. Step 904 ascertains whether the one or more motion inputs are a tap or taps, respectively. This step can be performed in any suitable way. In at least some embodiments, this step is performed through the use of an accelerometer and a microphone. Specifically, a tap or taps have a particular motion profile that is represented by accelerometer data and stored on the camera device. Further, the tap or taps have a particular noise profile that is also stored on the camera device. When the motion input is received, the camera's processor can analyze the accelerometer data and the noise input that is received and derive motion and noise profiles from the data, and then look for a stored tap profile for a match (both motion and noise). If an input is received that has a motion profile and noise profile that matches or resembles the tap profile to a certain degree, the processor can ascertain that the input is a tap.

Step 906 maps the tap or taps to a particular functionality. Specifically, in some embodiments, different combinations of taps are mapped to different functionalities respectively. Accordingly, this step can ascertain which of a number of different functionalities the tap or taps are associated with. Alternately, a single camera functionality, such as bookmarking a video, may be associated with tap input. In this case, the tap or taps are mapped to the single functionality.

Responsive to ascertaining which functionality is associated with the tap or taps, step 908 accesses the camera functionality that is associated with the input that was received. As noted above, any suitable type of functionality can be accessed. Step 910 activates the camera functionality. This step can be performed in any suitable way.

Conclusion

Various embodiments provide a wearable camera that can be worn by a user. The wearable camera includes an accelerometer that can be used to detect camera motion. Input can be provided to the camera in the form of one or more taps which have an associated motion profile, as sensed by the accelerometer. The tap or taps can be mapped to camera functionality to activate the functionality.

In at least some embodiments, different combinations of taps can be mapped to different camera functionality. Further, in at least some embodiments, the camera includes a microphone which detects sound around the camera. The microphone can be used to sense a noise profile associated with the tap or taps that are received by the camera. The noise profile can be used, together with the motion profile, to confirm the input as a tap input.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A method comprising:
  receiving, with a device, one or more motion inputs;
  ascertaining whether the one or more motion inputs are
    one or more taps to a dedicated tap area of a housing of
    the device, the dedicated tap area being formed from a
    material that is configured to produce an identifiable motion profile in order to facilitate detection of taps to the dedicated tap area; and responsive to the one or more motion inputs being one or more taps, activating a camera functionality that is associated with the one or more taps.

2. The method of claim 1, wherein said ascertaining is performed using an accelerometer on the device.

3. The method of claim 1, wherein said ascertaining is performed by:
   detecting the one or more motion inputs using an accelerometer;
   producing associated accelerometer data; and
   analyzing the accelerometer data to ascertain whether the motion profile associated with the one or more motion inputs matches or resembles one or more stored tap profiles.

4. The method of claim 1, wherein different tap patterns are mapped to different camera functionalities.

5. The method of claim 1, wherein the device comprises a wearable device.

6. The method of claim 5, wherein the wearable device is configured to be worn on a user's clothing.

7. The method of claim 5, wherein the wearable device is configured to be worn on a location other than a user's clothing.

8. A computing device comprising:
   a housing, the housing including a dedicated tap area that is formed from a material that is configured to produce an identifiable motion profile in order to facilitate detection of taps to the dedicated tap area;
   a camera lens configured to enable capture of image data;
   a motion detector configured to receive one or more motion inputs;
   a processor configured to:
      ascertain whether the one or more motion inputs are one or more taps to the dedicated tap area of the housing;
      responsive to the one or more motion inputs being one or more taps, activate a camera functionality that is associated with the tap or taps.

9. The computing device of claim 8, wherein the computing device comprises a wearable device.

10. The computing device of claim 8, further comprising a fastening device on the housing, the fastening device configured to enable the wearable device to be worn by a user.

11. The computing device of claim 8, wherein the motion detector comprises an accelerometer.

12. The computing device of claim 8, wherein the motion detector comprises an accelerometer and wherein the processor is configured to ascertain whether the one or more motion inputs are one or more taps by analyzing the accelerometer data to ascertain whether the motion profile associated with the one or more motion inputs matches or resembles one or more stored tap profiles.

13. The computing device of claim 8, wherein different tap patterns are mapped to different camera functionalities of the camera lens.

14. The computing device of claim 8, wherein the computing device is configured to enter a camera mode that enables video to be automatically captured by the camera lens, and wherein the camera functionality comprises functionality enabling the video that is automatically captured by the camera lens to be bookmarked.

15. A method comprising:
   automatically capturing video with a device;
   detecting one or more taps to a dedicated tap area of a housing of the device, the dedicated tap area being formed from a material that is configured to produce an identifiable motion profile in order to facilitate detection of taps to the dedicated tap area; and
   responsive to detecting the one or more taps to the device, automatically bookmarking the video captured by the device.

16. The method of claim 15, wherein the device comprises a wearable device.

17. The method of claim 16, wherein the wearable device is configured to be worn on a user's clothing.

18. The method of claim 16, wherein the wearable device is configured to be worn on a location other than a user's clothing.

19. The method of claim 1, wherein the device is configured to enter a camera mode that enables video to be automatically captured, and the camera functionality comprises functionality enabling the video to be bookmarked.

20. The computing device of claim 8, wherein the camera functionality comprises functionality enabling video to be bookmarked.

* * * * *